United States Patent [19]
Watanabe et al.

[11] Patent Number: 5,614,337
[45] Date of Patent: Mar. 25, 1997

[54] METHOD FOR MANUFACTURING MULTI-COLOR FILTER AND FULL COLOR DISPLAY DEVICES

[75] Inventors: Tsutomu Watanabe, Itami; Jun-ichi Yasukawa, Chigasaki; Toshiaki Ota, Narashino, all of Japan

[73] Assignee: Shinto Paint Co., Ltd., Hyogo-Ken, Japan

[21] Appl. No.: 565,154

[22] Filed: Nov. 30, 1995

[30] Foreign Application Priority Data

Dec. 20, 1994 [JP] Japan .................................. 6-335846

[51] Int. Cl.⁶ .......................... G02F 1/1335; G02B 5/20
[52] U.S. Cl. .................................... 430/7; 205/83
[58] Field of Search .............................. 430/7, 321, 20; 205/83, 122; 359/68

[56] References Cited

U.S. PATENT DOCUMENTS

| | | | |
|---|---|---|---|
| 3,855,106 | 12/1974 | Campbell et al. | 204/498 |
| 5,399,449 | 3/1995 | Tanimoto et al. | 430/7 |

FOREIGN PATENT DOCUMENTS

| | | |
|---|---|---|
| 0444631 | 9/1991 | European Pat. Off. . |
| 63-053520 | 3/1988 | Japan . |
| 63-240503 | 10/1988 | Japan . |
| 6-300911 | 10/1994 | Japan . |
| 6-308321 | 11/1994 | Japan . |

OTHER PUBLICATIONS

Abstract of JP 54-099144, Yukio et al. (Aug. 1979).
Abstract of JP 59-090818, Sunao (May 1984).
Abstract of JP 2-310396, Yutaro (Dec. 1990).

*Primary Examiner*—John A. McPherson
*Attorney, Agent, or Firm*—Watson, Cole, Stevens, Davis, P.L.L.C.

[57] ABSTRACT

A multi-color filter without a so-called bipolar phenomenon for use of color liquid crystal display devices is prepared by such a manner that plural sets of electroconductive circuits are prepared on transparent substrate; a given set of circuits on which a first color layer is to be formed is provided with a feeder circuit traversely in one lot; and the first electrodeposition is conducted by applying a current only to this set of circuits in order to impress a given voltage while voltage is increased gradually to a given level over a certain period of time, thereby forming the first color layer, and the electrodeposition is repeated in the similar way by applying current to each of the remaining sets of circuits.

6 Claims, 1 Drawing Sheet

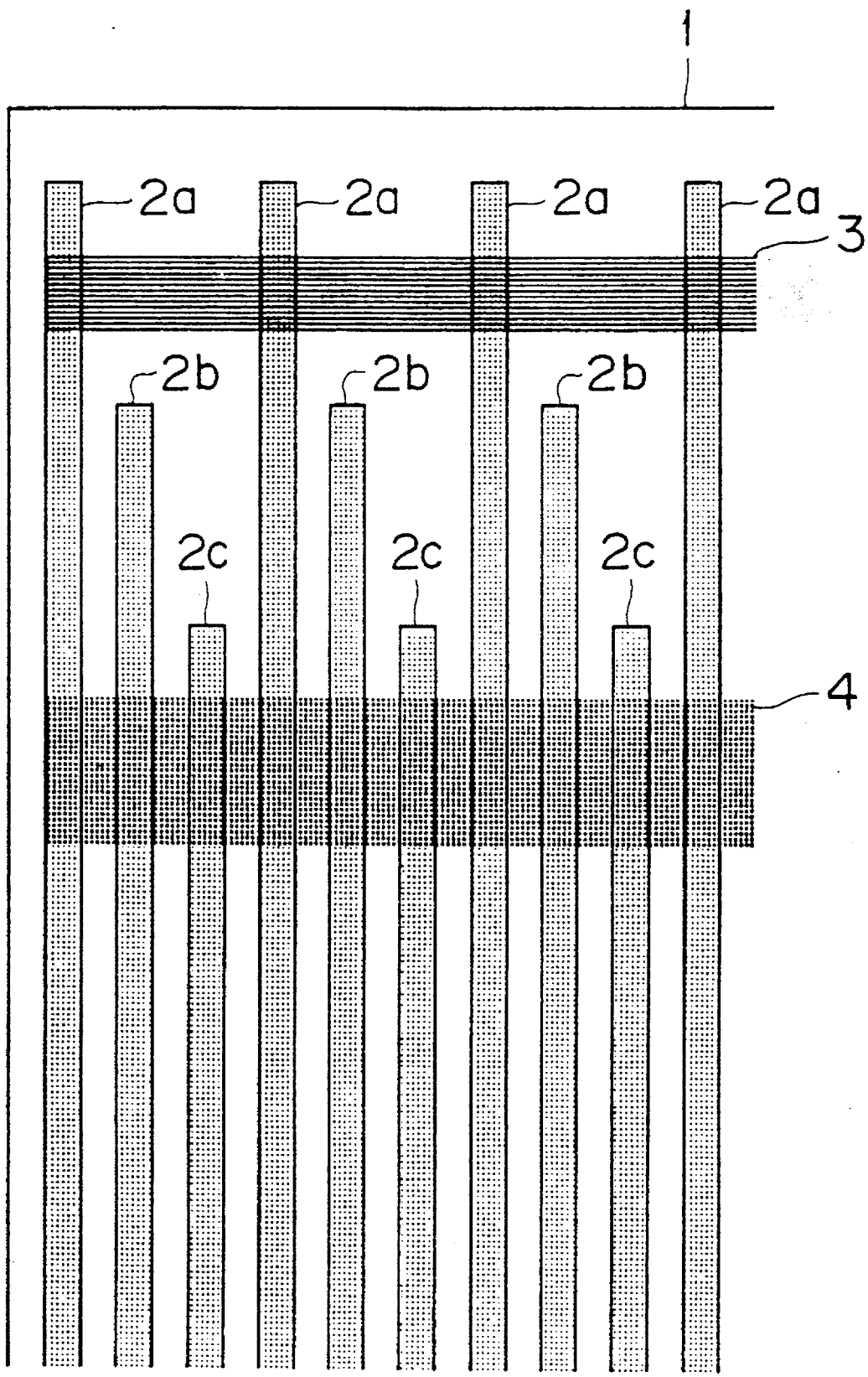

METHOD FOR MANUFACTURING MULTI-COLOR FILTER AND FULL COLOR DISPLAY DEVICES

The present invention relates to a method for manufacturing a multi-color filter, and a method for manufacturing full color display devices. More specifically, the invention relates to a method for manufacturing a multi-color filter by electrodeposition, and a method for manufacturing full color display devices using said filter.

Multi-color filters suitably used for full color display devices, such as color liquid crystal display devices, have been manufactured according to a dyeing, pigment dispersion, electrodeposition, printing, or other method, in which color layers, such as red, green and blue ones, and black matrices interlaced between the layers were formed on the surface of glass or other transparent substrates.

Among these methods, the electrodeposition method is particularly preferred from the industrial point of view, because color layers can readily be formed with high precision merely by dipping in an electrodeposition bath a transparent substrate having electroconductive circuits thereon, together with a counter electrode, and impressing a given voltage, followed by heat-treatments. This method is simple and gives highly precise color layers in high yield and at low manufacturing cost.

JP-A-63-240503, for example, teaches multi-color filters manufactured by electrodeposition wherein, among plural sets of electroconductive circuits prepared on such a transparent substrate as glass, a given set of the circuits on which a first color layer is to be formed is provided with a feeder circuit traversely in one lot, and the first electrodeposition is conducted by applying an electric current only to this set of circuits in order to form the first color layer. Then electric current is applied to each of the remaining sets of circuits successively in order to effect electrodeposition and form respective color layers, until a multi-color filter is prepared finally.

Meanwhile, color liquid crystal display (LCD) devices have been manufactured by placing a pair of base plates apart and parallel each other, the one base plate being made by integrally molding a multi-color filter, a polarizing plate and a transparent electrode, and the other being made by integrally molding a polarizing plate and a counter electrode, sealing the periphery of the base plates with a sealant, and finally filling the space between the base plates with a liquid crystal. However, adherence of the both base plates is poor when they are sealed, if there are any colored layers at the sealed portion of the multi-color filter.

Therefore, in the previous electrodeposition method for manufacturing multi-color filters, a given portion on the electroconductive circuits is covered traversely to the circuits with a protective insulating layer so as to form no color layers at the portion to be sealed, before electrodeposition is conducted successively, as mentioned above, to form a multi-color filter.

However, manufacture of, for example, a tricolor filter according to the previous electrodeposition method encounters a difficulty, so called "bipolar phenomenon". That is, during the formation of color layers of a first color on the selected circuits to which an electric current is applied, the color layers of the first color are formed also on a part of the unselected circuits in the neighborhood of the protective-insulating layer, to which circuits no electric current is applied, and which circuits lie between the first selected circuits. Moreover, the same phenomenon is observed also on the remaining unselected circuits when color layers of a second color are formed. The bipolar phenomenon in color filters not only results in color contaminations, but also impairs flatness of the color layers, until marked deterioration of the displaying quality of color LCD devices is induced. Thus, solution of such problems has been strongly desired.

JP-A-6-300911 mentions a method to prevent the bipolar phenomenon by providing additional dummy circuits which are superfluous for the formation of color layers. Also, JP-A-6-308321 discloses a method to prevent the phenomenon by patterning the circuit pattern in a complex form.

After the present inventors have extensively studied on methods to prevent the bipolar phenomenon in a commercially advantageous way, they find a method for manufacturing multi-color filters by electrodeposition, wherein, among plural sets of electroconductive circuits prepared on a transparent substrate, a given set of circuits on which a first color layer is to be formed is provided with a feeder circuit traversely in one lot; the first electrodeposition is conducted by applying an electric current only to this set of circuits in order to impress a given voltage, thereby forming the first color layer; and the electrodeposition is repeatedly conducted by applying current to each of the remaining sets of circuits successively to form respective color layers, thereby forming a multi-color filter finally, the method being characterized by conducting at least the first electrodeposition to form the first color layer in such a manner that the voltage is increased gradually to a given level over a given period of time.

The present invention is also to provide a method for manufacturing full color display devices, characterized by using said multi-color filters. More specifically, it is to provide a method for manufacturing full color display devices by placing a pair of base plates apart and parallel each other, the one base plate being made by integrally molding a multi-color filter, a polarizing plate and a transparent electrode, and the other plate being made by integrally molding a polarizing plate and a counter electrode; sealing the peripheries of the base plates using sealants; and finally filling the space between the base plates with a liquid crystal, the method being characterized by that the multi-color filter is one manufactured as mentioned in the previous paragraph.

BRIEF DESCRIPTION OF THE DRAWINGS

The sole FIGURE is a schematic plane view of a transparent substrate prepared for forming the first color layer in the manufacture of a tricolor filter, in which the numeral 1 is a transparent substrate, 2a is a set of electroconductive circuits longest in the length, 2b is that of next length to 2a and 2c is that the shortest, 3 is a feeder circuit and 4 is a protective insulating layer.

A transparent substrate 1 having on the surface, multiple sets of electroconductive circuits 2 insulated from each other is prepared. As shown in the sole FIGURE, a feeder circuit 3 is provided on the first selected set of circuits (2a), traversely in one lot, on which the first color layer is to be formed, and also a protective insulating layer 4 is provided traversely on all sets of the circuits so as to form no color layers at the portion to be sealed in the manufacture of full color display devices.

When a second color layer is formed, another feeder circuit is provided traversely on the second selected set of circuits (2b) on which a second color layer is to be formed, if desired, after removing the feeder circuit used for the formation of the first color layer. Although the second feeder circuit is provided traversely also on the first selected circuits (2a), there is no problem because the color layer formed in the first electrodeposition functions as an insulator.

The transparent substrate used in the present invention is made of glass or plastic plates.

On the surface of the transparent substrate is formed an electroconductive thin layer, such as ITO layer i.e., tin-doped indium oxide layer or NESA layer i.e., antimony-doped tin oxide layer, in a conventional manner, and then subjected to etching or the like in order to form plural electroconductive circuits insulated from each other in a desired pattern, such as stripes.

As the feeder circuit, a copper tape or a resin paste containing an electroconductive particles, such as silver, is used. The feeder circuit is provided only onto a definite set of the conductive circuits to which a current is to be applied, among plural sets of the conductive circuits, traversely to the circuit pattern in one lot, according to a conventional procedure.

The protective insulating layer is formed at a desired portion on the circuits which is to be the sealed portion when a full color display device is manufactured, traversely to the circuit pattern, using an insulating high molecular or inorganic material, by means of a photolithography, printing, painting, sputtering or other film-forming technique.

Electrodeposition is carried out in a conventional manner, including anionic and cationic. In the present invention, anionic electrodeposition is preferable, because of less influence to the electroconductive circuits.

An electrodeposition bath used for the present invention is prepared also in a conventional manner. As for binder resin materials used in the electrodeposition bath, thermosetting or photo-curable electrophoretic resins, such as maleinated oils, acrylics, polyesters, polybutadienes, polyolefins, and the like, are mentioned. These may be used singly or as a mixture. A colorant of a desired color, such as dyes and pigments and, if desired, conventional additives are blended to the binder resin materials, then dissolved or dispersed in an adequate solvent such as water and organic solvents and diluted to prepare the electrodeposition bath.

A vessel used for electrodeposition is not particularly limited as far as the material thereof is insulating and sufficiently resistant to the electrodeposition bath. For example, plastic vessels made of rigid polyvinyl chloride, acrylic resins or the like may be used.

In an electrodeposition bath in the vessel kept at a desired temperature, a transparent substrate on which circuits have been prepared, and a counter electrode, such as a stainless steel plate, are placed face to face in parallel at a distance.

In case of anionic electrodeposition, a given voltage is impressed between the substrate carrying circuits as an anode and the counter electrode as a cathode, to form a selected color layer on the selected set of circuits.

Electrodeposition is effected by impressing a voltage ranging from about 10 to 300 V for a period of time of about 1 second to 3 minutes, in order to obtain an electrodeposited layer of a desired thickness. In the present invention, however, it is essential to increase the voltage to a predetermined level for impression, not at a stroke, but in a gradual increase over a certain period of time.

Such a manner of impression by increasing voltage taking a certain period of time is necessary at least for the formation of first color layer. Such impression is preferably applied for the formation of a subsequent color layer or layers by applying current to other set or sets of circuit, so far as there remain other set or sets of circuit to which current have not yet been applied for the formation of other color layers. For example, in the formation of color layers of red, green and blue colors in this order, the manner for increasing the voltage is applied preferably for the formation of a green color layer, as well as for the formation of the red color layer.

Although the time taken for increasing the voltage to a predetermined level is not particularly limited as far as bipolar phenomenon is efficiently prevented, it is usually several seconds or longer. If the time is too long, the productivity is lowered, and moreover the flatness of the color layers tends to deteriorate. Therefore, it is at most 30 seconds, most preferably 10 to 15 seconds or less. The time taken for increasing the voltage can be controlled in any known manner, for example, by controlling the program in a rectifier used.

After the electrodeposition is over, the color layers formed are preferably rinsed well in order to remove unnecessary substances on the layers. If desired, the color layers may be heat-treated at a temperature of 100° to 280° C. for 10 to 120 minutes in order to enhance the layer strength.

After the formation of the color layers by electrodeposition according to the present invention, black matrices may be formed between or among the color layers in any known manner. Alternatively, the black matrices may be formed on the transparent substrate before carrying out electrodeposition according to the present invention.

Thus, such a simple manner as that applied voltage is raised over a certain period of time, as in the method of manufacturing multi-color filters according to the present invention, prevents any bipolar phenomenon, which is a long-felt problem to be solved, with high efficiency and commercial advantages.

Moreover, the multi-color filters thus-obtained yields full color display devices, such as color LCD devices, having superior displaying quality, simply by fabricating the multi-color filters with other elements in a conventional manner.

The present invention is illustrated in more details with reference to the following Example, which is only illustrative but not limitative.

EXAMPLE

An aqueous resin solution comprising water and Esbia ED #3000 Clear* in a weight ratio of 120:5 was mixed with a mixture of Pigment Red 4BS (manufactured and sold by Sanyo Color Works, Japan) with transparent iron oxide (TOR, sold by Dainichiseika Color & Chemicals Mfg. Co., Japan), Phthalocyanine Green SAX (manufactured and sold by Sanyo Color Works) or Phthalocyanine Blue SR-150 (ditto), to prepare a red, green or blue electrodeposition bath, respectively.

* Esbia ED #3000 Clear: a paint for electrodeposition, manufactured and sold by Shinto Paint Co., Japan, and composed of 70% by weight of a resin mixture of water-soluble polyester resin and water-soluble melamine resin, and 30% by weight of a solvent mixture of Butyl Cellosolve, Ethyl Cellosolve and n-buthanol.

On the other hand, a glass substrate of 1.1 mm in thickness, 300 mm in width and 350 mm in length was prepared, on the surface of which there have been formed three sets of tin oxide (ITO) circuits of 15 $\Omega/\square$ of each 80 μm width stripes with 20 μm distance (namely in a 100 μm pitch), each set having different length; a urethane resin layer of 5 mm in width, as protective insulating layer, pasted traversely to the circuit stripes at the portion of 2 cm down from the upper end of the longest set of circuits; and a feeder circuit made of a silver paste (manufactured and sold by Fujikura Kasei Co., Japan) covering only the longest set of circuits in one lot traversely to the circuit stripes.

The glass substrate as an anode and a stainless steel plate as a cathode were dipped into the red electrodeposition bath, and a direct current was applied through the feeder circuit. The voltage was increased from 0 V to 50 V gradually over about 10 seconds, and kept at 50 V for 10 seconds before break off to complete the electrodeposition.

Thus, a red color layer was formed only on the longest set of circuits with high precision, and no bipolar phenomenon was observed on the other sets of circuits to which no current was applied.

Subsequently, the same electrodeposition was repeated, except that the green electrodeposition bath was used, and a direct current was applied through a feeder circuit provided traversely on the next length set of circuits, to form a green color layer with high precision and with no bipolar phenomenon.

Finally, electrodepositiion was carried out in a manner similar to the above, using a blue electrodeposition bath, except that the voltage was increased to 50 V at a stroke.

As a result, there were formed red, green and blue color layers on all sets of circuits with high precision and with no bipolar phenomenon.

We claim:

1. A method for manufacturing multi-color filters by electrodeposition wherein, among plural sets of electroconductive circuits prepared on a transparent substrate, a given set of circuits on which a first color layer is to be formed is provided with a feeder circuit traversely in one lot; the first electrodeposition is conducted by applying an electric current only to this set of circuits in order to impress a given voltage, thereby forming the first color layer; and the electrodeposition is conducted by applying an electric current to each of the remaining sets of circuits successively to form respective color layers, thereby forming a multi-color filter, the method being characterized by conducting at least the first electrodeposition to form the first color layer in such a manner that the voltage is increased gradually to a given level over a given period of time.

2. A method according to claim 1, wherein the voltage level ranges from about 10 to 300 V.

3. A method according to claim 2, wherein the period of time over which the voltage is increased to said level is at least several seconds.

4. A method according to claim 2, wherein the period of time over which the voltage is increased to said level is at most 30 seconds.

5. A method according to claim 1, wherein the electric current is a direct current, and is applied for about 1 second to 3 minutes.

6. A method for manufacturing full color display devices, by placing a pair of base plates apart and parallel each other, the one base plate being made by integrally molding a multi-color filter, a polarizing plate and a transparent electrode, and the other being made by integrally molding a polarizing plate and a counter electrode; sealing the peripheries of the base plates using sealants; and filling the space between the base plates with a liquid crystal, the method being characterized by that the multi-color filter is one manufactured by the method according to claim 1.

* * * * *